April 3, 1951     W. PARRISH     2,547,038
REVERSING GEAR
Filed May 11, 1948     3 Sheets-Sheet 1
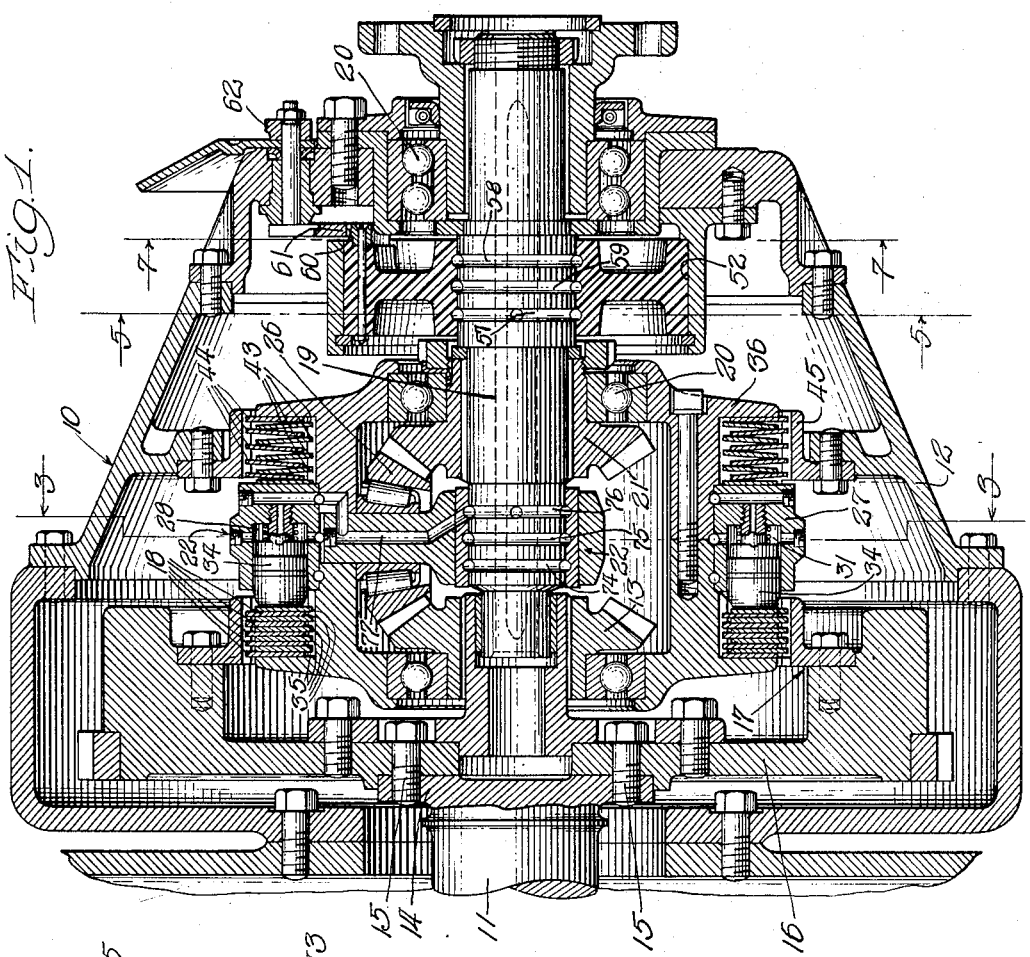

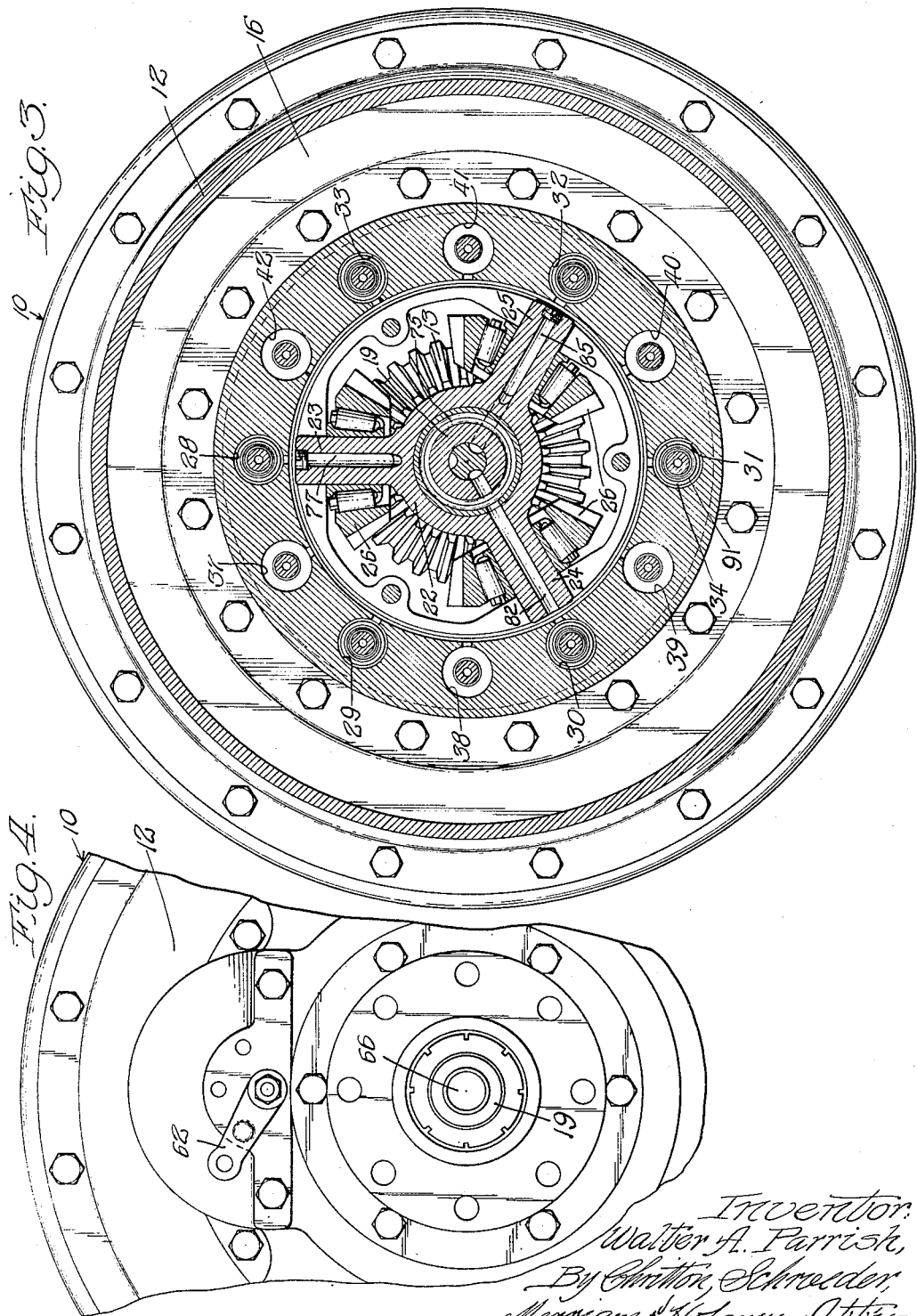

April 3, 1951 W. PARRISH 2,547,038
REVERSING GEAR
Filed May 11, 1948 3 Sheets-Sheet 3
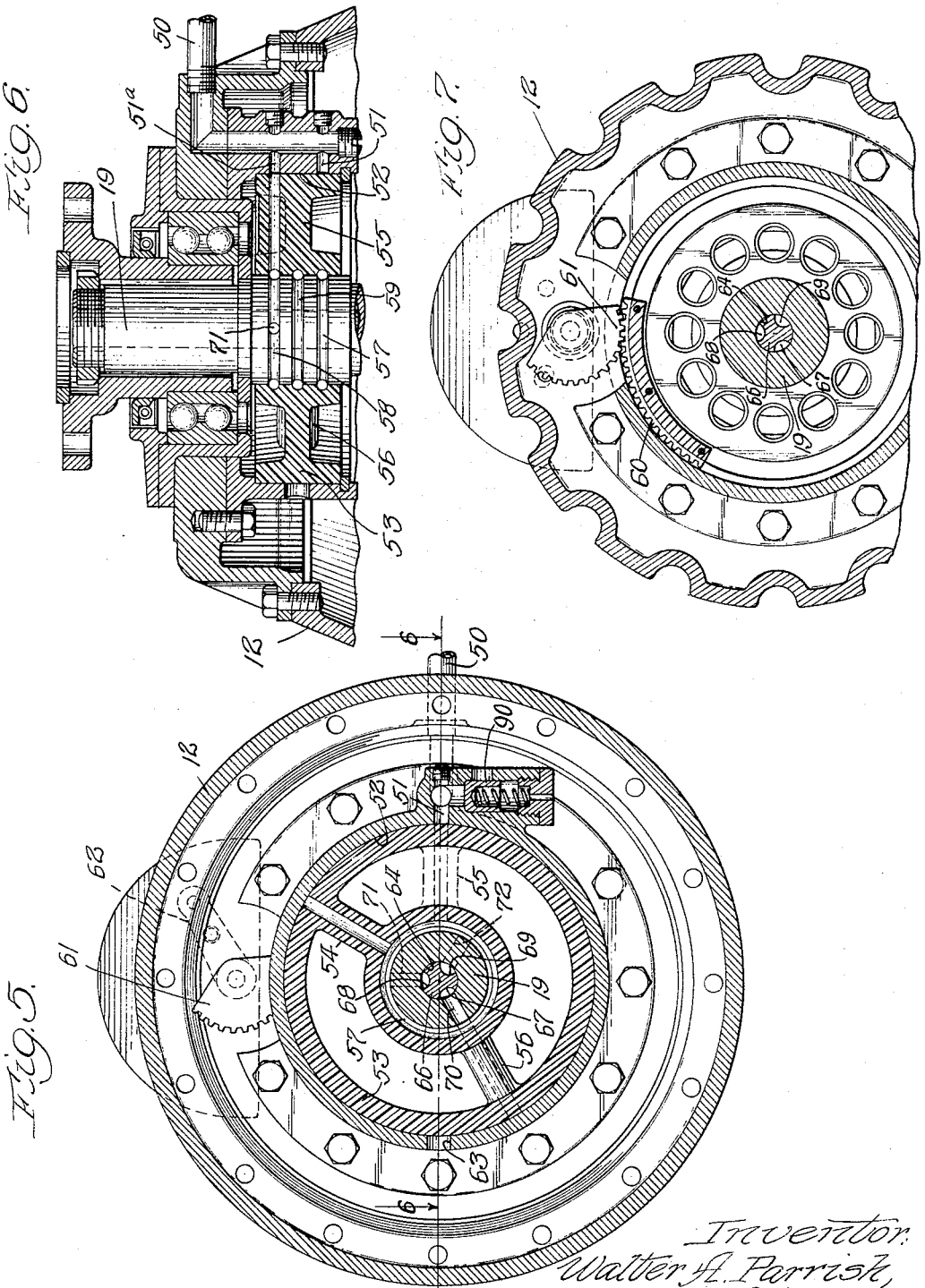

Patented Apr. 3, 1951

2,547,038

UNITED STATES PATENT OFFICE 2,547,038

REVERSING GEAR

Walter Parrish, Grosse Pointe Woods, Mich., assignor to Research Engineering Corporation, a corporation of Indiana Application May 11, 1948, Serial No. 26,381

3 Claims. (Cl. 74—780)

This invention relates to a reversing gear and more particularly to a hydraulically controlled reversing gear.

The reversing gear of this invention comprises generally a drive gear and a driven gear with a planet carrier interposed therebetween, and includes means for clutching the planet carrier to the drive gear or braking it to the housing in which the reversing gear is mounted in order to impart rotation to the driven gear in the same or opposite direction to the rotation of the drive gear. Such forms of reversing gear have in the past generally included annular bands to clamp the planet carrier to the drive gear or to hold the planet carrier stationary in the housing in order to impart the desired rotation to the driven gear. The bands of such constructions were generally mechanically controlled and actuated, and the entire unit occupied considerable space.

The reversing gear of this invention is provided with clutching means for operating the planet carrier, which clutching means are hydraulically controlled. By reason of such construction, I am able to contain the entire unit within a considerably smaller space than was heretofore possible. I am further able to effect ready and precise control of the operation of the device together with a considerable saving in weight.

The invention will be described in conjunction with the embodiment shown in the accompanying drawings, in which:

Fig. 1 is a sectional view showing the housing and the reversing gear; Fig. 2 is an enlarged detailed view of the piston and cylinder device for actuating the clutch means; Fig. 3 is a sectional view along the line 3—3 of Fig. 1; Fig. 4 is a fragmentary rear elevation of the reversing gear; Fig. 5 is a sectional view along the line 5—5 of Fig. 1; Fig. 6 is a sectional view along the line 6—6 of Fig. 5; and Fig. 7 is a sectional view along the line 7—7 of Fig. 1.

Referring now to the drawings, 10 indicates the reversing gear which comprises a drive shaft 11 rotatably mounted in a housing 12 and carrying a beveled drive gear 13. Attached to a flange 14 on the drive shaft by bolts 15 is an annular clutch-carrying member 16 which carries a clutch means designated as 17, the latter comprising a plurality of annular clutch faces 18. A driven shaft 19 is rotatably mounted upon bearings 20 in the housing 12 and has fixed thereto a beveled driven gear 21.

Interposed between the drive gear and the driven gear is a planet carrier arrangement, generally designated 22, which is in the familiar form of a spider having three arms 23, 24 and 25 upon each of which is rotatably mounted a beveled pinion 26. The planet carrier is mounted for free rotation on the shaft 19, that is to say, is not fixed thereto. The beveled pinions 26 mesh with the drive and driven gears in the usual manner. The planet carrier 22 includes a first annular element 27 having a plurality of cylinders 28—33 formed therein with a piston 34 mounted for reciprocation in each of said cylinders. The member 27 is also provided with a plurality of annular clutch faces 35 interposed between the clutch faces 18 of the clutch member 17. Reciprocation of the piston 34 to the left to the position shown in Fig. 1 is adapted to press the clutch faces 18 and 35 into clutching engagement with each other to cause rotation of the planet carrier 22 in the same direction and at the same speed as that of the drive shaft 11. The planet carrier is also provided with a second plurality of cylinders 37—42 each of which is provided with a piston operable in the same manner as the piston 34 to press a plurality of brake faces 43 attached to the member 36 into braking engagement with the brake faces 44 on a member 45 fixed to the housing 12.

It can be seen from the foregoing that reciprocation of the pistons associated with the member 27 to the left to the position shown in Fig. 1 to clutch the planet carrier to the drive shaft causes rotation of the planet carrier in the same direction and at the same speed as the rotation of the drive gear 13. The rotation of the drive gear is thereby imparted to the driven gear 21 to rotate the driven shaft 19 in the same direction and at the same speed as that of the drive shaft 11. Similarly reciprocation of the pistons associated with the member 36 to the right to brake that member, and hence the planet carrier, to the housing serves to stop rotation of the planet carrier whereby rotation of the drive gear is imparted to the driven gear through the beveled pinions 26 to rotate the driven gear and hence the driven shaft in a direction opposite to the direction of rotation of the drive shaft. With the planet carrier clutched to neither the drive shaft nor the housing, the planet carrier is free to rotate upon the shaft 19 and will rotate at half the speed of the drive gear which rotation, of course, imparts no motion to the driven gear 21.

Hydraulic means are provided for actuating the pistons to cause the clutching and braking just described. Referring now to Fig. 5, the housing is provided with a conduit 50 connected to a source of fluid pressure (not shown). The conduit 50 leads into the housing through a passage 51 to an annular chamber portion 52 of the housing in which is located a rotatable fluid control device 53. The device 53 is provided with three hollow spoke-like members 54, 55 and 56. Members 54 and 55 are adapted to be brought into registry with the passages 51 and 51a to permit the flow of pressure fluid therethrough. The hollow portion of each of the spokes just referred to connects at its inner end to an annular groove provided on the driven shaft 19. Thus, for example, the passage in the spoke 54 connects with the groove 57, that of the spoke 55 with the groove 58, and that of the spoke 56 with the groove 59.

The rotatable device 53 is provided with a series of teeth 60 along a portion of its outer periphery, which teeth engage those of a gear segment 61 attached to a control lever 62. Movement of the control lever is adapted to rotate the segment 61 and hence the member 53 to bring the passageways in the spokes 54 and 55 into registry with the passages 51 and 51a, as desired. It will be noted that in moving the passageway in the spoke 54 in a clockwise direction to bring it in registry with the passage 51, the passage in the spoke 56 is brought into registry with a return port 63 connected to a sump. In the specific example described, the passage in the spoke 55 is adapted to direct control fluid to the pistons in the element 27 to cause forward rotation of the driven shaft, while passage of control fluid through the spoke 54 is adapted to actuate the pistons in the member 36 to cause reverse rotation of the drive shaft. It can thus be seen that in shifting from forward to reverse, or vice versa, the passage in the spoke 56 is brought into registry with the return port 63.

The driven shaft 19 is drilled to provide a hole 64 which hole is partially plugged by a quill-like element 66. The element 66 is provided with three semi-cylindrical recesses 67, 68 and 69 each of which recesses is connected by passages 70, 71 and 72, respectively to one of the annular grooves 57—59 in the driven shaft. By this arrangement, it is necessary that only one hole be drilled longitudinally of the driven shaft and the hole is divided into three separate portions by means of the quill 66. If desired, however, three separate holes may be drilled.

That portion of the driven shaft upon which the planet carrier rotates is provided with a second series of three annular grooves 74, 75 and 76 each of which connects to one of the longitudinal passages 67—69. Each of the arms 23—25 of the planet carrier is provided with an interior passage connecting to one of the annular grooves 74—76. The arm 23 is therefore provided with a passage 77 which connects at its inner end to the annular groove 76 and by means of passageway 78 to an annular conduit 79. The conduit 79 connects by means of short passages 80 and 81 to the interior of the cylinder 28, and similar passages 80 and 81 are provided to connect the conduit 79 with each of the cylinders in the member 27. The arm 24 is likewise provided with a passageway 82 which connects at its inner end to the annular groove 75 and at its outer end to an annular conduit 83 which connects by means of short passageways 84 to each of the pistons 28—33 and 37—42. The arm 25 is provided with a passage 85 connecting by means of an annular conduit similar to the conduit 79 to each of the pistons in the member 36. It will be noted that the annular conduit 83 is connected to all pistons and this conduit therefore is utilized as a return line to return fluid from the pistons to the sump or tank during operation of the reversing gear.

The operation of the device is as follows: Moving the selector lever to the position shown in Fig. 5 permits control fluid entering from the conduit 50 to pass through passage 51a (passing by a pressure relief valve 90 connected in parallel to the passages 50 and 51). The passage in the spoke 55 is in registry with the passageway 51a permitting control fluid to pass therethrough and hence into the annular groove 58, recess 69, annular groove 76, passage 77, annular conduit 79, passageways 80 and 81, to reciprocate the pistons 28—33 to the left to the position shown in Fig. 1. This action clutches the planet carrier to the drive shaft to rotate the driven shaft in the same direction and at the same speed as the drive shaft.

If it is desired to reverse the direction of rotation of the driven shaft, the lever 62 is moved to its reverse position to rotate the ring 53 and bring the passageway in the spoke 54 into registry with the port 51. During rotation of the member 53 the passage in the spoke 56 will be brought into registry with the return port 63 permitting fluid within the cylinders 28—33 to return to the sump via passageways 84, conduit 83, passageway 82, annular groove 75, recess 67 and annular groove 57. When the selector lever is moved to its reverse position, the passage in the spoke 54 is brought into registry with the port 51 whereupon control fluid may pass therethrough and into the annular groove 59, recess 69, annular groove 74, passage 85 and thence to the cylinders 37—42 to reciprocate the pistons therein to the right to bring the brake faces 43 into braking engagement with the faces 44 to brake the planet carrier to the housing. Thus the driven shaft will rotate in a direction opposite to the direction of the drive shaft. To assist the return of each of the pistons to its neutral or unclutching position, tension springs 91 are provided in each cylinder. The pistons are reciprocated in a clutching direction against the tension of the spring by the control fluid and return of the control fluid to the return port is assisted by the operation of the springs in urging the pistons toward their neutral positions.

While I have shown and described my invention in its preferred embodiment, it is to be understood that it is capable of many modifications. Changes, therefore, in the construction and arrangement may be made without departing from the spirit and scope of the invention as disclosed in the appended claims.

I claim:

1. A reversing gear comprising a housing; a drive shaft and a driven shaft rotatably mounted in the housing; a drive gear mounted on the drive shaft and a driven gear mounted on the driven shaft; a freely rotatable planet carrier interposed between said gears and having a spider with at least three arms; a gear on each arm meshing with the drive gear and with the driven gear; clutch means for clutching the planet carrier to the drive shaft; brake means for braking the rotation of the planet carrier; a first plurality of hydraulically operable piston and cylinder devices on the planet carrier for actuating the clutch means; a second plurality of hydraulically operable piston and cylinder devices on the planet carrier for actuating the brake means; a fluid passage in each of at least three of said arms, the first of said fluid passages being connected to the first plurality of cylinders, the second of said passages being connected to the second plurality of cylinders and the third of said passages being connected to all of said cylinders; a single passageway extending longitudinally of the driven shaft, a quill element inserted in the passageway and dividing the passageway into three hydraulic conduits with each conduit being connected to a different one of said passages; a source of fluid pressure; control means including a wheel-like member having three spokes, a control passage in each spoke connected to a different one of said conduits with the control passage in the third spoke being connected to the conduit connected to the third passage, an inlet port connected to the source of fluid pressure and an exhaust port; and means for rotating the wheel-like member to bring the control passages in either the first or second spoke into registry with the inlet port, rotation of said member between positions connecting said control passages in the first or second spoke with said inlet port causing intermediate registry of the control passage in said third spoke with the exhaust port.

2. A reversing gear comprising a housing, a drive shaft and a driven shaft rotatably mounted in the housing, a drive gear mounted on the drive shaft and a driven gear mounted on the driven shaft, a freely rotatable planet carrier interposed between said gears and having a spider with at least three arms, a gear on each arm meshing with the drive gear and with the driven gear, clutch means for clutching the planet carrier to the drive shaft, brake means for braking the rotation of the planet carrier, a first plurality of hydraulically operable piston and cylinder devices on the planet carrier for actuating the clutch means, a second plurality of hydraulically operable piston and cylinder devices on the planet carrier for actuating the brake means, a fluid passage in each of at least three of said arms, the first of said fluid passages being connected to the first plurality of cylinders, the second of said passages being connected to the second plurality of cylinders and the third of said passages being connected to all of said cylinders, a single passageway extending longitudinally of the driven shaft, a quill element in the passageway and dividing the passageway into three hydraulic conduits with each of said conduits being connected to a different one of said passages, a source of fluid pressure, control means selectively movable to direct fluid pressure to the first or second passage, and an exhaust line from the control means, said control means being adapted to connect the conduit connected to the third passage to the exhaust line when moved from a position directing fluid to the first passage to a position directing fluid to the second passage.

3. A reversing gear comprising a housing, a drive shaft and a driven shaft rotatably mounted in the housing, a drive gear mounted on the drive shaft and a driven gear mounted on the driven shaft, a freely rotatable planet carrier interposed between said gears and having a spider with at least three arms, a gear on each arm meshing with the drive gear and with the driven gear, clutch means for clutching the planet carrier to the drive shaft, brake means for braking the rotation of the planet carrier, a first plurality of hydraulically operable piston and cylinder devices on the planet carrier for actuating the clutch means, a second plurality of hydraulically operable piston and cylinder devices on the planet carrier for actuating the brake means, a fluid passage in each of at least three of said arms, the first of said fluid passages being connected to the first plurality of cylinders, the second of said passages being connected to the second plurality of cylinders and the third of said passages being connected to all of said cylinders, three hydraulic conduits in the driven shaft with each conduit being connected to a different one of said passages, a source of fluid pressure, control means selectively movable to direct fluid pressure to the first or second passage, and an exhaust line from the control means, said control means being adapted to connect the conduit connected to the third passage to the exhaust line when moved from a position directing fluid to the first passage to a position directing fluid to the second passage.

WALTER PARRISH.

REFERENCES CITED

The following references are of record in the file of this patent:

UNITED STATES PATENTS

| Number | Name | Date |
|---|---|---|
| 1,653,262 | Dickson | Dec. 20, 1927 |
| 1,891,182 | Ross | Dec. 13, 1932 |
| 1,896,440 | Durig | Feb. 7, 1933 |
| 2,158,054 | Bradbury | May 16, 1939 |
| 2,417,198 | Hindmarch | Mar. 11, 1947 |